United States Patent

Baur

[11] Patent Number: 5,950,842
[45] Date of Patent: *Sep. 14, 1999

[54] LINE CONNECTOR WITH 90 DEGREE ROTATION MECHANISM

[75] Inventor: Wilhelm Baur, Gestratz, Germany

[73] Assignee: Natec, Reich, Summer GmbH & Co. KG, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/700,389
[22] PCT Filed: Feb. 1, 1996
[86] PCT No.: PCT/EP96/00416
§ 371 Date: Nov. 20, 1996
§ 102(e) Date: Nov. 20, 1996
[87] PCT Pub. No.: WO96/26141
PCT Pub. Date: Aug. 29, 1996

[30] Foreign Application Priority Data

Feb. 23, 1995 [DE] Germany .................. 295 03 014 U

[51] Int. Cl.⁶ .................................................. B07C 5/02
[52] U.S. Cl. ...................... 209/540; 209/657; 209/918; 198/416; 198/452
[58] Field of Search ...................... 209/656, 657, 209/918, 540; 198/416, 448, 452, 779

[56] References Cited

U.S. PATENT DOCUMENTS

| | | | |
|---|---|---|---|
| 2,805,753 | 10/1957 | Palmer | 198/33 |
| 3,428,161 | 2/1969 | Niederer | 198/779 X |
| 4,004,677 | 1/1977 | Heier et al. | 198/452 |
| 4,913,295 | 4/1990 | Murphy et al. | 209/657 X |
| 4,927,031 | 5/1990 | Martin | 209/657 |
| 4,934,537 | 6/1990 | DeBourke | 209/657 X |
| 5,161,665 | 11/1992 | Cragun | 198/448 |

FOREIGN PATENT DOCUMENTS

| | | |
|---|---|---|
| 708997 | 8/1941 | Germany . |
| 9115750 | 10/1991 | WIPO ............................. 209/657 |

Primary Examiner—Tuan N. Nguyen
Attorney, Agent, or Firm—Brown, Martin, Haller & McClain, LLP

[57] ABSTRACT

A line connector apparatus has at least one table receiving items to be conveyed from at least one feeder conveyor. At least one guide mechanism is rotatably mounted on the table for selectively guiding items into two different directions, one direction leading into a transport path, and the other direction leading away from the transport path and into a discard container for defective items.

9 Claims, 3 Drawing Sheets

LINE CONNECTOR WITH 90 DEGREE ROTATION MECHANISM

BACKGROUND OF THE INVENTION

The present invention is directed to a line connector that can fan in two production lines into one production line. It is generally the case that the production lines have to be fanned in but in addition defective products will be eliminated. In some cases this may require switching the provided product, for packaging reasons.

In the past, three separate machines had to be used in order to achieve three steps—connecting, separating, fanning. The result was the utilization of more space as well as higher cost.

SUMMARY OF THE INVENTION

It is an object of the present invention to provide a new and improved line connector which may provide at least a partial combination of functions which were performed separately in the past.

According to the present invention, a line connector apparatus is provided which comprises a table positioned to receive items from at least one feeder conveyor, and at least one guide member rotatably mounted on the table to guide items received from the feeder conveyor into a transport path. The guide member is rotatable between a first position in which defective items are displaced off the transport path, and a second position in which acceptable products are guided and conveyed into the transport path.

It is essential that a workstation or table where one or more conveyors meet, is equipped with several corresponding guide and rotation mechanisms. With the assistance of the guide mechanisms, products will be moved to the provided transport path or will be eliminated if they are defective. Elimination will be done through the support of a rotation mechanism (some degree of torsion is possible).

Preferably two guide mechanisms and two torque mechanisms as well as two feeders, i.e. start-cycle-conveyors, are provided. In this case the guide mechanisms have a pivoted design and will form a V-shaped channel during operation for the intake and connection of the products, provided that these products meet the quality criteria. It is then possible to move the guide mechanisms independent from each other, in order to prevent a defective package from entering the opening.

The design will secure the torque mechanism, in the shape of a buffer, directly to the guide mechanism. The buffer may be flexible or inflexible; its starting point may reflect different geometric shapes especially round, square, oval and other shapes. It is also possible to provide an adjustable and additional flexible buffer.

In order to detect whether individual packages are defective, it is already pre-programmed to have sensors or measuring mechanisms installed in the feeder and start cycle conveyors. These sensors will detect the condition of the package and will provide this information to the appropriate guide mechanism through the controls. When the package is in good order the guide mechanism will turn outward, i.e. it will remain in this condition so that the package may enter between the guide mechanisms. If however the package is defective, the guide mechanism will turn inward, i.e. it will remain in that position in order for the package to move to the outside of the guide mechanism, diverted by the guide mechanism and sorted out.

In order to process delicate products like food items, especially cheese and similar soft food products through the new system, a table with a roll conveyor is preferred. This roll conveyor may consist of simple rollers or may be a revolving roll conveyor. Using this roll conveyor keeps the system power at a minimum during handling of packages. This way any deformation and/or damage of soft products is eliminated.

BRIEF DESCRIPTION OF THE DRAWINGS

The present invention will be better understood from the following detailed description of a preferred embodiment of the present invention, taken in conjunction with the accompanying drawings, in which like reference numerals refer to like parts, and in which.

DESCRIPTION OF THE PREFERRED EMBODIMENT

Figure 1:
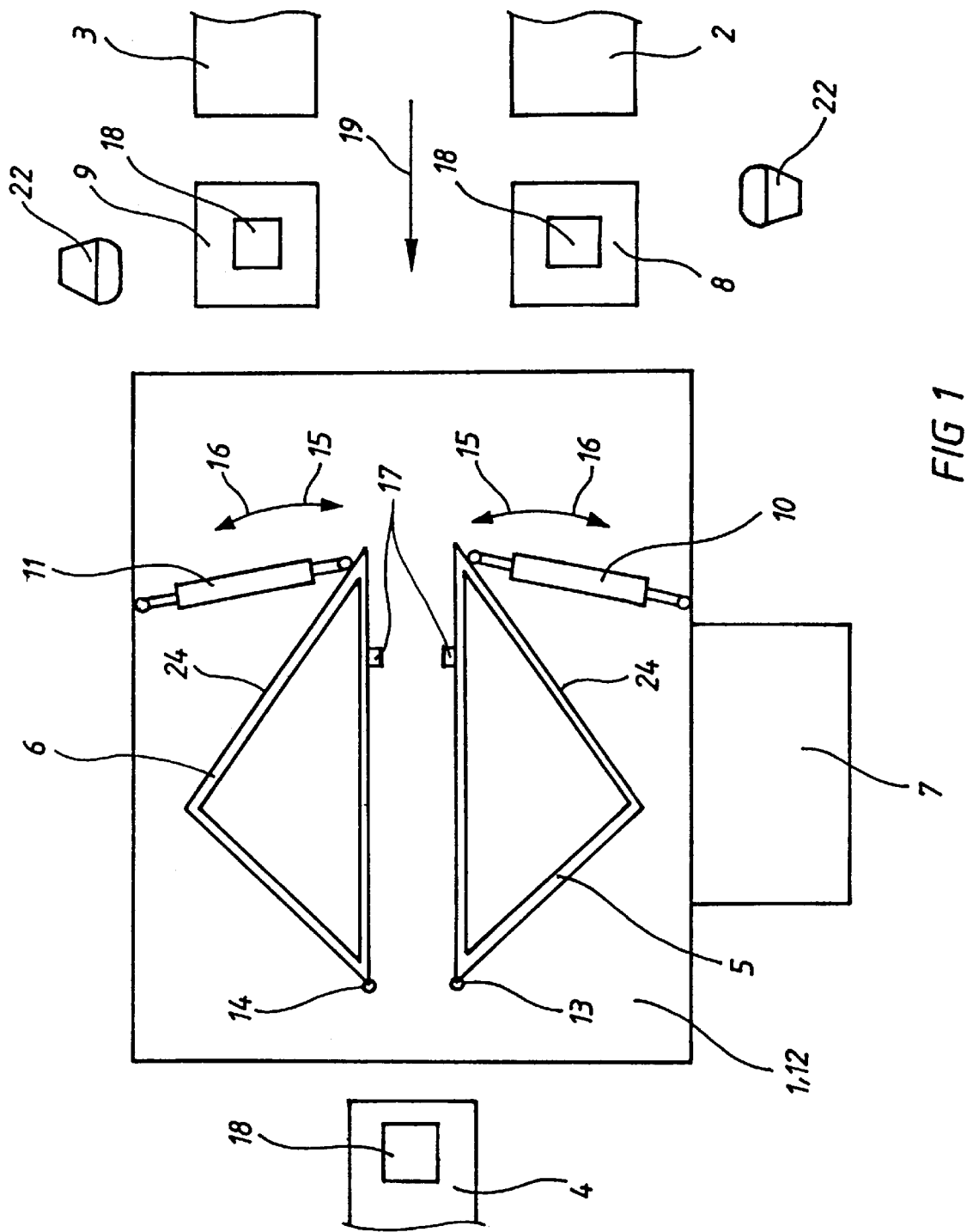
FIG. 1 is a plan view of a line connector apparatus according to a preferred embodiment of the invention.
Figure 2:
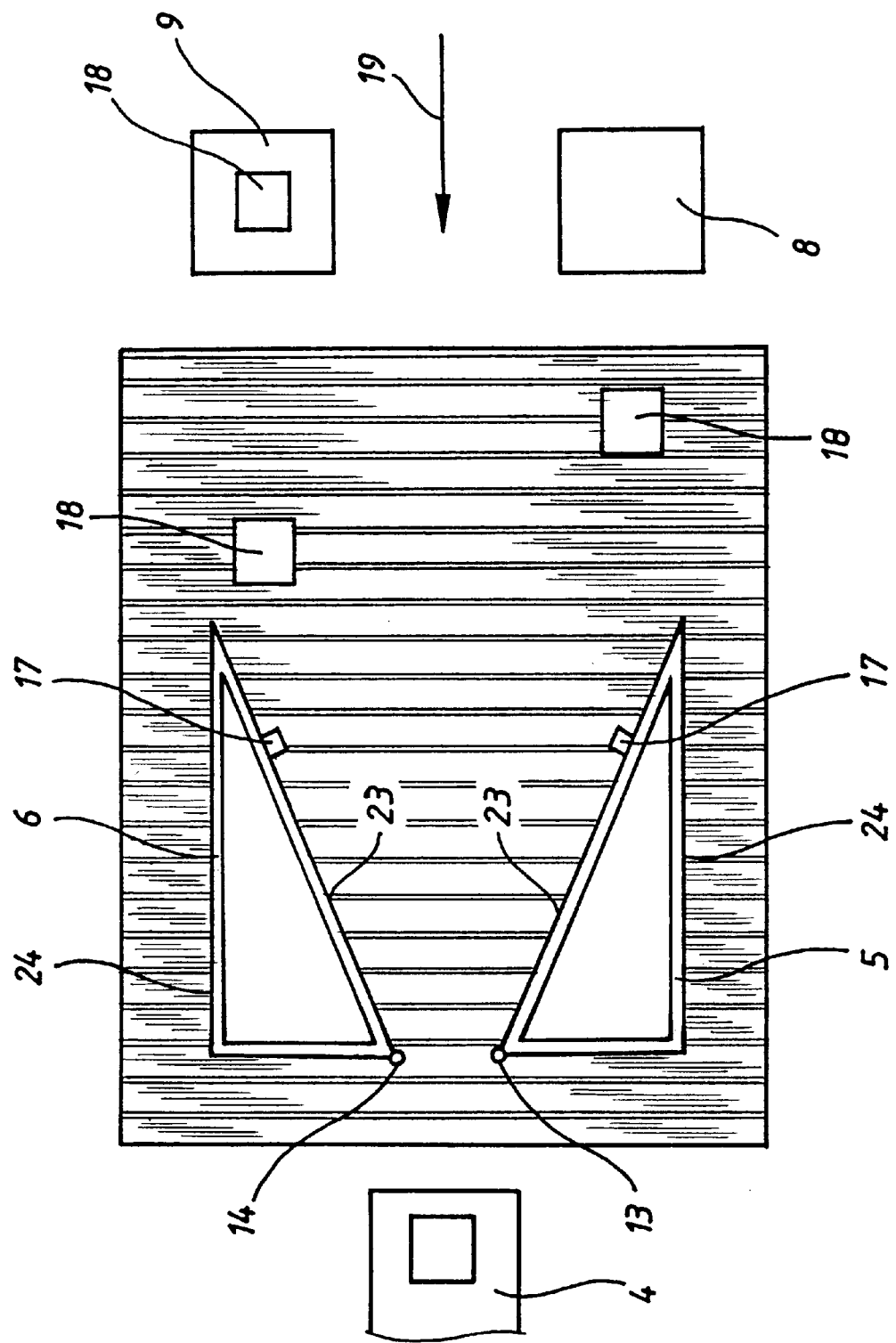
FIG. 2 is a view similar to FIG. 1 with the apparatus in operating position.

According to FIGS. 1, 2, the new line connector consists of a table 1, which is being supplied via two feeder conveyors 2, 3 through the start cycle conveyors 8, 9 in direction of arrow 19. These conveyors then transport packages 18, which run through the machine in direction of arrow 19 and which are then removed by outlet conveyor 4.

A roll conveyor 12 is provided on table 1. Two guide mechanisms 5, 6 are attached to table 1.

The guide mechanisms each have an inner slide face and hub 23, and an outer slide face and hub 24. The inner slide face and hub 23 has a fitting strip 17 attached to each guide mechanism.

The operation is as follows:

The packages 18 will be transported from both feeder conveyors 2, 3 to the start cycle conveyors 8, 9. A sensor 22 will monitor the condition of the packages 18.

When a faulty package reaches one of the start cycle conveyors 8, 9, the corresponding guide mechanism 5, 6 will be swivelled inward through rotation axis 13, 14 in direction of arrow 1 5 through the corresponding position 10, 11.

The faulty package 18 then is moved to the outer slide face 24. It moves along the side of the slide face and then falls into a container 7 provided.

If a package 18 is in good condition, the guide mechanism will swivel outward and the package will slide along inner slide face 23, in the direction of the arrow 16 through the guide mechanism 5, 6.

As shown in FIG. 2, the start cycle conveyors 8, 9 work in a staggered fashion. This is necessary to prevent packages 18 in the rear area of the guide mechanisms 5, 6 from colliding and becoming wedged or jammed.

Figure 3:
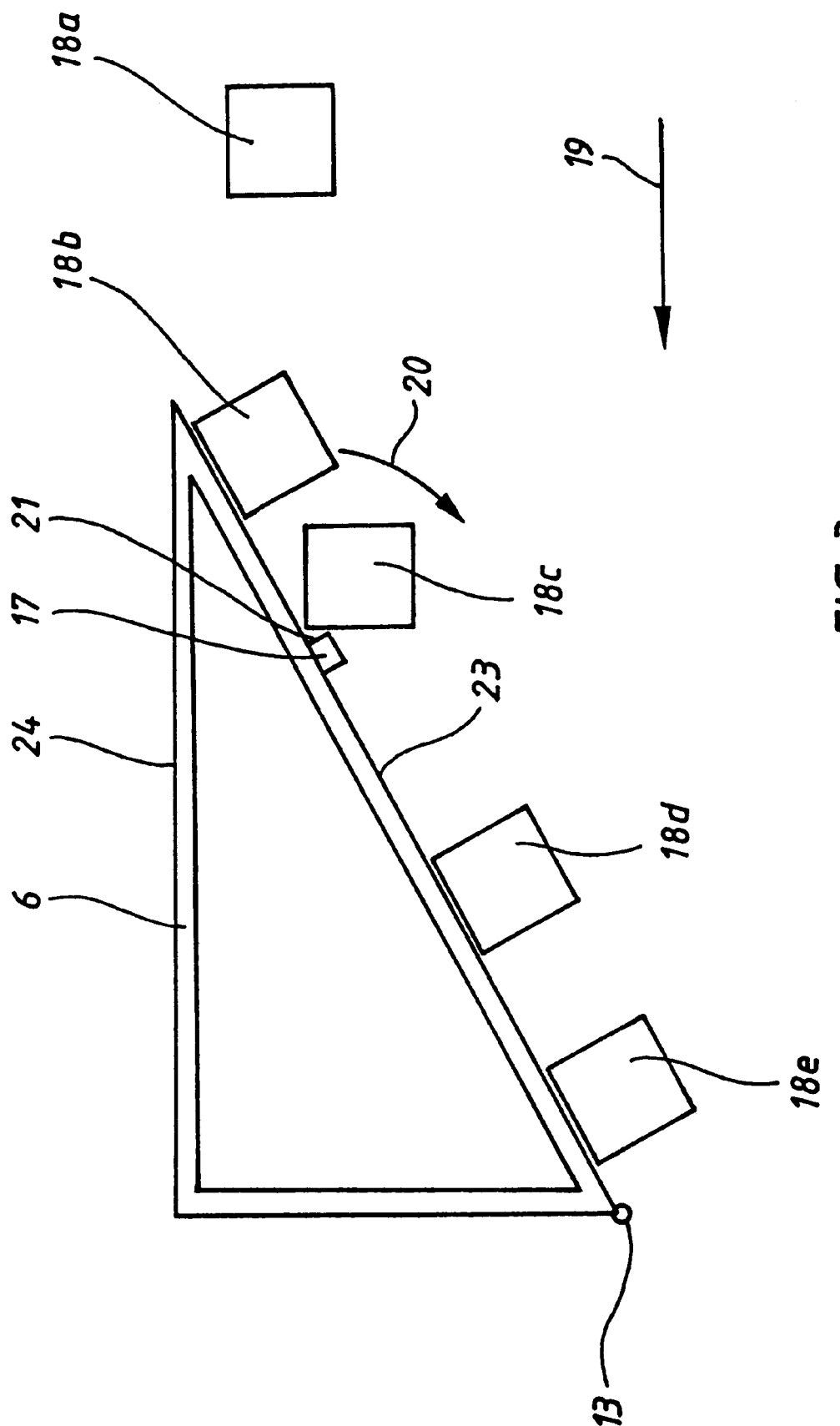
FIG. 3 is an enlargement of FIG. 2.

FIG. 3 schematically depicts the torque and centering procedure. A package 18 will be transported to its position 18a to the roll conveyor 12 by start cycle conveyor 9. It then moves due to the motion of the roll conveyor, in direction of arrow 19 and arrives at the unit at the inner slide face 23 of the guide mechanism 6. It then moves along this inner slide face until it arrives at the stop edge 21 of the fitting strip 17. Since the roll conveyor continues to move in the direction of arrow 19, the package 18 will be transported in direction or arrow 20 in its position 18c. Thereafter it will be moved to positions 18d, 18e through the roll conveyor, and finally moved to the outlet conveyor 4.

Overall, this construction is cost saving and compact. When a specially equipped version, which offers swivel guide mechanism 5, 6 as part of roll conveyor 12 attached to table 1, is used, all three functions described above (i.e., connecting, separating, and fanning) may be implemented simultaneously.

The subject matter of the presented innovation is cost saving, of simple construction, and compact.

Although a preferred embodiment of the invention has been described above by way of example only, it will be understood by those skilled in the field that modifications may be made to the disclosed embodiment without departing from the scope of the invention, which is defined by the appended claims.

I claim:

1. A line connector apparatus for feeding items into a single transport path from plural product lines, the apparatus comprising:

at least two separate feeder conveyors;

a table positioned to receive items from the feeder conveyors;

at least two guide members rotatably mounted on the table to guide items received from the respective feeder conveyors into the single transport path, each guide member being rotatable between a first position in which defective items from the respective conveyor are displaced off the transport path and a second position in which acceptable items are guided and conveyed into the transport path; and each guide member having an inner slide face for guiding items into said transport path, each inner slide face having a rotation means for rotating items as they are guided into the transport path.

2. The apparatus as claimed in claim 1, wherein each guide member is rotatably mounted for rotation about a swivel axis between said first and second positions.

3. The apparatus as claimed in claim 1, wherein each guide member has an outer slide face for displacing items away from said transport path.

4. The apparatus as claimed in claim 3, wherein the inner slide faces of the guide members together in said second position form a V-shaped channel leading into said transport path.

5. The apparatus as claimed in claim 1, including at least one sensor for detecting defective items.

6. The apparatus as claimed in claim 1, wherein the table has a roll conveyor for conveying items along said transport path.

7. The apparatus as claimed in claim 1, including a single outlet conveyor for removing items from the transport path of said table.

8. A line connector apparatus for feeding items into a single transport path from plural product lines, the apparatus comprising:

at least two separate feeder conveyors;

a table positioned to receive items from the feeder conveyors;

at least two guide members rotatable mounted on the table to guide items received from the respective feeder conveyors into a single transport path, each guide member being rotatable between a first position in which defective items from the respective conveyor are displaced off the transport path and a second position in which acceptable items are guided and conveyed into the transport path;

each guide member having an inner slide face for guiding items from a respective feeder conveyor into said transport path, each inner slide face having a first end for receiving items from the respective feeder conveyor and a second, exit end from which items enter the transport path; and each inner slide face having a limit stop projecting outwardly from said slide face, said limit stop being located at a position between said first and second ends for rotating items as they travel along said slide face.

9. The apparatus as claimed in claim 8, wherein the limit stop has a square stop edge.

* * * * *